United States Patent [19]

Di Luccio

[11] Patent Number: 4,524,099
[45] Date of Patent: Jun. 18, 1985

[54] COEXTRUDED ELASTOMERIC FILMS

[75] Inventor: Robert C. Di Luccio, Wilmington, Del.

[73] Assignee: E. I. Du Pont de Nemours and Company, Wilmington, Del.

[21] Appl. No.: 526,960

[22] Filed: Aug. 30, 1983

Related U.S. Application Data

[63] Continuation-in-part of Ser. No. 424,448, Sep. 27, 1982, abandoned.

[51] Int. Cl.³ ................................................. B32B 7/02
[52] U.S. Cl. ................................ 428/213; 428/476.9.; 428/516; 428/520; 428/906; 428/913; 426/127; 264/171; 264/176 R; 220/449; 229/87 F
[58] Field of Search ........................................ 428/913

[56] References Cited

U.S. PATENT DOCUMENTS

| | | | |
|---|---|---|---|
| 3,595,735 | 7/1971 | Tyrrell | 428/323 X |
| 3,817,821 | 6/1974 | Gallini | 426/127 X |
| 4,352,849 | 10/1982 | Mueller | 428/520 X |

FOREIGN PATENT DOCUMENTS 46750 4/1981 Japan .................................. 428/520

*Primary Examiner*—Patricia C. Ives
*Attorney, Agent, or Firm*—Paul R. Steyermark

[57] ABSTRACT

A transparent, elastomeric, composite film structure having a core ethylene/vinyl acetate copolymer and outer layers of a low density ethylene homopolymer or copolymer with a small amount of another α-olefin or vinyl acetate is made by coextrusion of the polymers in a three-layer combining adapter and quenching on a chill roll. This film structure is useful as a wrapping material, especially for heat-sensitive articles.

9 Claims, 2 Drawing Figures

COEXTRUDED ELASTOMERIC FILMS

This is a continuation-in-part of my application Ser. No. 424,448, filed Sept. 27, 1982, now abandoned.

BACKGROUND OF THE INVENTION

This invention relates to a process for producing transparent elastomeric polymer films particularly suitable for wrapping heat-sensitive articles, to the transparent elastomeric films themselves, and to articles wrapped in such films.

Transparent films are commonly used for packaging various consumer items, which thus can be examined by the prospective purchaser without opening the package. The most common are heat-shrinkable films, but those cannot be used for packaging heat-sensitive products, especially certain food articles. There are also used non-elastomeric stretch-films, such, for example, as poly(vinylidene chloride). Those films, however, lack sufficient elastic recovery for forming an esthetically pleasing, snug overwrap.

Certain ethylene/vinyl acetate copolymers (sometimes hereafter abbreviated to EVA copolymers), especially those containing about 30-50 weight % of vinyl acetate comonomer, form a transparent elastomeric film, which can be used in packaging applications. In order to improve the film's formability, for example, creep resistance, the film is normally exposed to high energy radiation, which induces crosslinking. But even though such irradiated EVA copolymer films having a vinyl acetate content in excess of 30% have satisfactory mechanical properties, they also have high surface tackiness, which causes difficulties both in production windup and in machine packaging applications.

Various approaches to solving this high tackiness problem have been proposed. For example, the copending application Ser. No. 259,422 of Mahr et al. filed May 1, 1981, now U.S. Pat. No. 4,310,212, proposes alcoholysis or hydrolysis of surface vinyl acetate groups, preferably followed by attachment to the surface of finely divided mineral particulates. Another copending application of Mahr et al., Ser. No. 278,435, filed June 25, 1981, now U.S. Pat. No. 4,374,898, teaches treating the EVA film surface with a coupling agent and then attaching particulate material to the surface.

However, still other methods of improving the properties and reducing the surface tackiness of elastomeric EVA films are sought.

SUMMARY OF THE INVENTION

According to the present invention, there is now provided a transparent, elastomeric, composite film structure having nontacky surface properties, said film structure comprising a core layer of an EVA copolymer containing about 30-50 weight percent of vinyl acetate and two outer layers, coextruded with said core layer, of a polymeric material selected from the class consisting of homopolyethylene and copolymers of ethylene with up to 10% by weight of the copolymer of a $C_3$-$C_8$ α-olefin or vinyl acetate, said outer layer polymeric material having a density of at most 0.94 g/cm$^3$, said two outer layers providing about 0.5-10% of the total thickness of said composite film structure, which structure following coextrusion is exposed to high energy radiation of which it absorbs about 4-16 megarads.

This invention also includes a process which comprises coextruding a composite film structure having the above composition and irradiating the coextruded structure with high energy radiation to improve its elastic recovery and reduce stress whitening after stretching and relaxing.

DETAILED DESCRIPTION OF THE INVENTION

Figure 1:
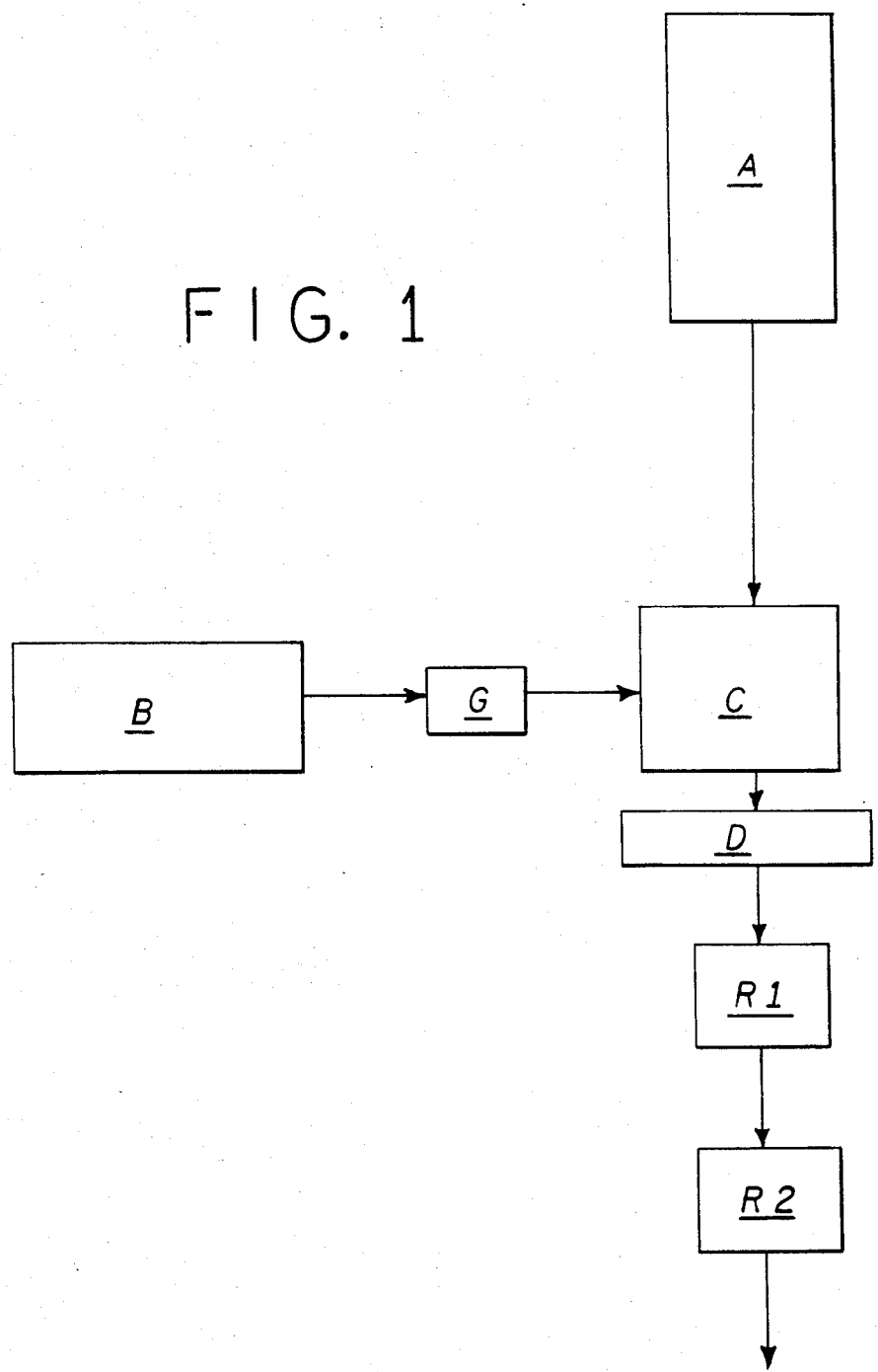
FIG. 1 illustrates schematically the process of the present invention.

Definition: An elastomeric material is a material which, when stretched to twice its original length and released, returns with force to substantially its original length.

EVA copolymers suitable in the process of the present invention are available from several sources including E. I. du Pont de Nemours and Company. The preferred EVA copolymer contains about 40 weight percent of vinyl acetate. As the proportion of this comonomer in the copolymer increases, the elastomeric properties of the copolymer improve, but its tackiness also increases. Above about 50% of vinyl acetate, the tackiness of the copolymer may be impractically high. Below about 30% of vinyl acetate, the elastomeric properties of the copolymer tend to be unsatisfactory.

When at least one outer polymer layer is thin, about 1% of the total composite film structure or less, it is advantageous to add to the EVA copolymer prior to coextrusion about 1-3% by weight of a long chain aliphatic amide or bisamide to improve the composite's slip properties and reduce blocking. Various commercially available products can be used, including stearamide, oleamide, erucamide, palmitamide, ethylenebis(oleamide), and ethylenebis(erucamide).

The compositions of the outer layers of the composite film structure can be the same or different. In practice, they will be made of the same polymeric material since no particular advantage will normally be gained by using different materials for this purpose. However, it may sometimes be practical to have different outer layers, either based on different polymers or compounded with different components, e.g., pigments of different colors, or having different thicknesses. All such alternatives are contemplated by the present invention.

A suitable ethylene homopolymer is a branched material obtained by a free radical-initiated polymerization at a high pressure. A copolymer of ethylene with vinyl acetate is made by the same technique. Suitable copolymers of ethylene with α-olefins may be made either by a free radical-initiated polymerization or by polymerization in the presence of a coordination catalyst, a so-called Ziegler type catalyst. These latter type copolymers are essentially linear. They are often sold as so-called linear low density polyethylene (LLDPE), which strictly speaking is an incorrect designation. The linear copolymers are preferred to either the branched homopolymer or branched copolymers because branched polymers have a tendency to assume spatial orientation and to crystallize, thus reducing the polymer film's ability to retract after stretching. The α-olefin comonomer can be, for example, propene, 1-butene, isobutene, 1-hexene, 1-octene, and 2-methylhexene. Ethylene copolymers with small amounts of vinyl acetate also are commercially available. They do not suffer from the shortcoming of high viscosity associated with copolymers having high vinyl acetate content and have physical properties which are entirely satisfactory for this purpose.

The composite film structures of the present invention are made by coextrusion, which is possible with a special three-layer combining adapter made by Cloeren Co., Orange, Tex. This adapter is described in U.S. Pat. No. 4,152,387 to Peter Cloeren, which is incorporated herein by reference. Thermoplastic materials flowing out of extruders at different velocities are separately introduced into the adapter containing back pressure cavities and flow restriction channels, and the several layers exiting the flow restriction channels converge into a melt composite. These separate streams are at the same flow velocity and thus form uniform composite layers. The combining adapter is used in conjunction with extruders supplying the thermoplastic materials to be laminated. Since the outer ethylene polymer layers are very thin as compared with the core layer, it is advisable to use a low throughput delivery means such as a pump, preferably a gear pump, in the ethylene polymer feed line.

Referring now to FIG. 1, extruder A supplies to combining adapter C the core EVA copolymer, while extruder B supplies through gear pump G the outer layer ethylene polymer. The three streams leaving adapter C enter die D, wherein they are formed into a three-layer composite melt having the desired thickness. The composite melt is solidified on chill roll R1, then wound up on roll R2 and slit as required.

Figure 2:
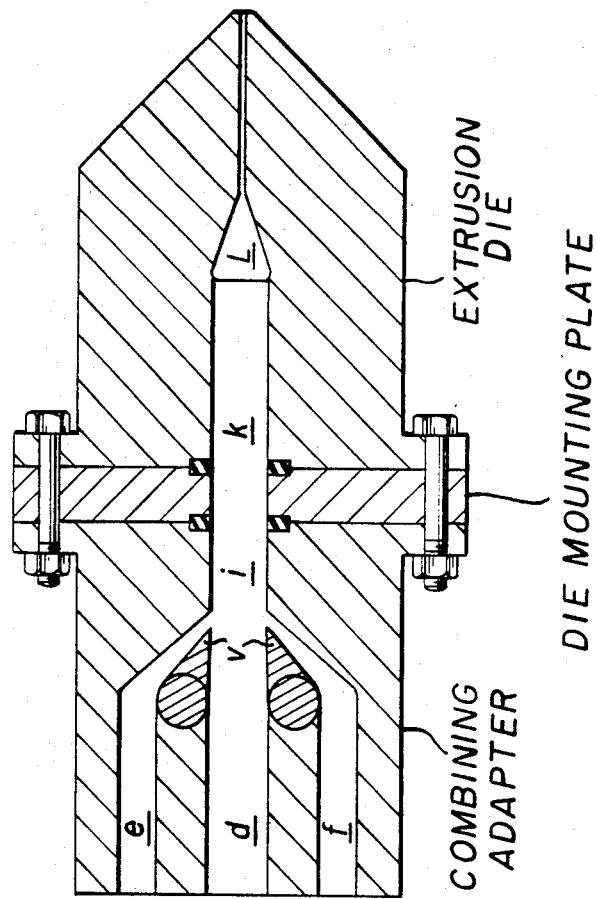
FIG. 2 is a cross-sectional view of a three-layer combining adapter and a die mounted together as an assembly.

FIG. 2 shows a cross-section of the combining adapter C and die D of FIG. 1. The flow from extruder B enters channels e and f of the adapter, while the flow from extruder A enters channel d of the adapter. Vanes V streamline the polymer flow in all three channels in the adapter. The vanes move in response to changes in the volumetric flow rates within the channels. This permits changes in layer thickness over a wide range while maintaining layer uniformity. The combining adapter C is made of 4140 stainless steel which can withstand pressures as high as 10,000 psi (690 MPa) at 600° F. (316° C.).

The three-layer melt exits the adapter through channel i and enters channel k of the die block and thence continues to channel 1 of a flexible lip extrusion die, which has a gap typically set at about 10 mils (0.25 mm) and is drawn down to 2 mils (0.05 mm) or less.

Referring again to FIG. 1, extruder A used in this work was a Killion 1½-in. (3.8 cm) model KL-500 single screw extruder having a length to diameter ratio of 24:1. The barrel was made of "Xaloy" 406 (Xaloy, Inc., Princeton, N.J.) and the screw of flame hardened 4140 stainless steel. The maximum available rotational speed was 115 rpm. Extruder B, used for the outer layer ethylene polymer, was a Killion 1-in. (2.5 cm) model KTS-100 single screw extruder having a length to diameter ratio of 24:1. The screws in both extruders were of the type used for polyethylene. The extruders were purchased from Killion Co. in Pompano Beach, Fla. Gear pump G, installed downstream of extruder B, was purchased from Zenith Products, Newton, Mass. With this pump, flow rates of molten ethylene polymer lower than 0.454 kg/hr were possible. Die D was an 18-in. (45.7 cm) "Ultraflex" H75 model obtained from Extrusion Dies, Inc., Chippewa, Wis.

The composite film exiting the die was passed over a chill roll and wound up without stretching on a low tension winder.

The typical operating conditions were as follows:

The core EVA copolymer was "Vynathene" 901-25, manufactured by U.S. Industrial Chemicals, Inc., New York, N.Y., a copolymer of 60% ethylene and 40% vinyl acetate. It had a density of 0.962 g/cm$^3$ and a melt index of 7.5 g/10 min determined according to ASTM D1238.

The outer layer ethylene polymer was a commercial, branched, high pressure homopolymer which had a density of 0.917 g/cm$^3$ and a melt index of 15 g/10 min.

The extruder feed temperature was 270° F. (132° C.), and the body temperature was 355° F. (180° C.). The molten extruded composite was cooled in contact with a chill roll maintained at 40° C.

The extruders operated as follows:

Extruder A 10–50 rpm, output 4.5–10 kg/hr.

Extruder B 5–22 rpm, output from the gear pump 0.15–1.135 kg/hr.

Gear pump G 2.5–3.0 rpm.

The thickness of each layer in the final composite structure depends on the polymer output from the appropriate extruder. If, for example, extruder A delivers EVA copolymer at a rate of 9.8 kg/hr, and extruder B delivers ethylene polymer at a rate of 0.2 kg/hr, the composite will have a core constituting 98% of the composite's thickness and two outer layers each accounting for 1% of the thickness.

Extruder A was operated at pressures within the range of 1200–1900 psi (8.3–13.1 MPa).

Extruder B was operated at pressures within the range of 1200–3100 psi (8.3–21.4 MPa).

Gear pump G pressures: upstream 1000–3000 psi (6.9–20 MPa), downstream 800–2800 psi (5.5–19.3 MPa).

To insure proper feed into the gear pump, the upstream pressure was always at least equal to the downstream pressure.

Irradiation of the composite film was accomplished using a General Electric 2 MV electron beam scanner Model 11 AD6.

The following representative examples illustrate this invention. The equipment and conditions were those discussed above.

All composite film samples were irradiated to absorb 4, 6, 8, and 12 Mrad of high energy radiation. In Examples 1–3 sample recovery, and/or resistance to whitening were determined after stretching by 120% and relaxing.

EXAMPLE 1

A composite film having a cross-section of 1% polyethylene/98% EVA copolymer/1% polyethylene was made and examined microscopically. It had uniform layers with good adhesion. All irradiated films were clear, free of haze, and resistant to stress whitening. Good slip and blocking properties were observed. The recovery of these samples after stretching was 85–92%.

EXAMPLE 2

A composite film having a cross-section of 3% polyethylene/94% EVA copolymer/3% polyethylene was made and examined microscopically. It had uniform layers with good adhesion. All irradiated samples resisted stress whitening. The film had good slip and block properties. The recovery of the samples was 80–88%.

EXAMPLE 3

Two film composites having the indicated polyethylene/EVA copolymer/polyethylene thicknesses were prepared and irradiated. Their recoveries after stretching are shown in the table below.

TABLE 1

| Run | Thickness (%) | Irradiation energy absorbed (Mrad) | Recovery (%) |
| --- | --- | --- | --- |
| A | 3-94-3 | 4 | 80 |
|  |  | 6 | 83 |
|  |  | 8 | 85 |
|  |  | 12 | 88 |
| B | 1-98-1 | 4 | 83 |
|  |  | 6 | 85 |
|  |  | 8 | 89 |
|  |  | 12 | 92 |

EXAMPLE 4

Whitening after stretching was determined for composite film structures having an EVA copolymer core and polyethylene outer layers having the indicated thicknesses (as percentages of the total thickness). Those film structures were irradiated at four radiation levels, stretched to varying lengths, and released. Whitening, if any, was observed visually. The following results were obtained:

TABLE 2

| Sample, Layer thickness, % | Irradiation energy absorbed Mrad | Whitening after stretching* | | | |
| --- | --- | --- | --- | --- | --- |
|  |  | 200% | 150% | 120% | 100% |
| A, 10-80-10 | 4 | ++ | ++ | — | + |
| B, 5-90-5 | 6 | ++ | + | + | 0 |
| C, 3-94-3 | 8 | ++ | + | 0 | 0 |
| D, 1-98-1 | 12 | ++ | + | 0 | 0 |

* ++ means strong whitening; + means moderate whitening; 0 means no whitening; — means not tested.

The above data show that composite films having outer layers of a total thickness of either 2% or 6% can be stretched by 120% without whitening. When the total thickness is 10%, they can be stretched by 100% without whitening and by 120% with moderate whitening. When the total thickness is 20%, the films show whitening even at 100% stretching.

Because of good elastomeric properties of the composite film structures of the present invention and of their resistance to stress whitening upon stretching by 100% and relaxing, these film structures are suitable for wrapping various articles, especially consumer goods which can be visually inspected without opening the package, and particularly heat-sensitive articles which otherwise might be damaged by heat-shrinking operations, especially food articles, various biologically active preparations, and similar goods.

I claim:

1. A transparent, elastomeric composite film structure having nontacky surface properties, said film structure comprising a core layer of an ethylene/vinyl acetate copolymer containing about 30–50 weight percent of vinyl acetate and two outer layers, coextruded with said core layer, of a polymeric material selected from the class consisting of homopolyethylene and copolymers of ethylene with up to 10% by weight of the copolymer of a $C_3$–$C_8$ α-olefin or vinyl acetate, said outer layer polymeric material having a density of at most about 0.94 g/cm$^3$, said two outer layers providing about 0.5–10% of the total thickness of said composite film structure, which structure following coextrusion is exposed to high energy radiation of which it absorbs about 4–16 megarads.

2. A composite structure of claim 1 wherein the two outer layers provide at most about 6% of the total thickness.

3. A composite structure of claim 1 or 2 wherein the core copolymer contains about 1–3 weight percent of a long chain aliphatic amide or bisamide.

4. A composite structure of claim 3 wherein the amide or bisamide is selected from the class consisting of stearamide, oleamide, erucamide, palmitamide, ethylenebis(oleamide), and ethylenebis(erucamide).

5. A composite structure of claim 3 wherein the thickness of at least one outer layer is less than about 1% of the total composite structure thickness.

6. A composite structure of claim 1 or 2 wherein the core copolymer is a copolymer of about 60 weight percent of ethylene and 40 weight percent of vinyl acetate.

7. A composite structure of claim 1 or 2 wherein the outer layer polymeric material is a linear copolymer of ethylene with an α-olefin.

8. An article wrapped in a composite film structure of claim 1 or 2.

9. An article of claim 8 which is heat-sensitive.

* * * * *